A. BAGLIN.

Hat and other Head Covering.

No. 8,972. Reissued Nov. 18, 1879.

Witnesses.

Otto Hufeland

J. A. Rutherford

Inventor

Amelia Baglin by

Van Santwoord & Hauff her attorneys

N. PETERS, PHOTO-LITHOGRAPHER, WASHINGTON, D. C.

UNITED STATES PATENT OFFICE.

AMELIA BAGLIN, OF BROOKLYN, NEW YORK.

IMPROVEMENT IN HATS AND OTHER HEAD-COVERINGS.

Specification forming part of Letters Patent No. 218,915, dated August 26, 1879; Reissue No. 8,972, dated November 18, 1879; application filed October 22, 1879.

*To all whom it may concern:*

Be it known that I, AMELIA BAGLIN, of Brooklyn, in the county of Kings and State of New York, have invented a new and useful Improvement in Head-Coverings, which improvement is fully set forth in the following specification, reference being had to the accompanying drawings, in which—

Figure 1:
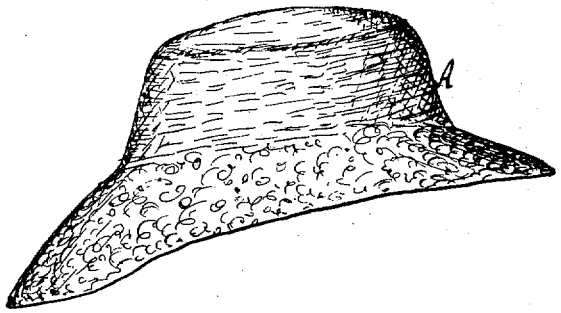
Figure 2:
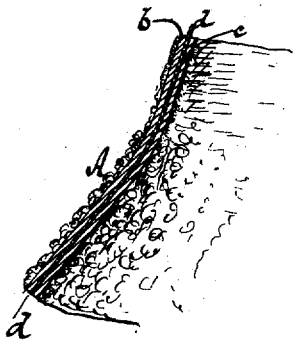

Figure 1 represents a cross-section of a hat embodying my invention. Fig. 2 is a side view of the same.

Similar letters indicate corresponding parts.

My invention consists of a head-covering in imitation of a silk, plush, or beaver hat, made of canton-flannel with the nap exposed, the same being held in position by a suitable supporting material.

In the example shown in the drawings, the letter A designates a hat formed of two layers, *b c*, of canton-flannel and an intervening layer, *d*, of buckram. The function of this intervening layer *d* is to support the layers of canton-flannel, and it is obvious that other materials besides buckram may be used for this purpose.

In carrying out my invention I place the canton-flannel, with its nap exposed, on its supporting layer or layers and unite the same by a suitable adhesive substance, which also assists in stiffening the fabric, and the compound fabric thus obtained is then pressed in suitable dies or otherwise brought in the desired form to produce a head-covering of the desired shape or character. After having pressed the article I finish the outer layer, *b*, of canton-flannel by laying smooth that part of the nap which is on the crown of the hat and roughing that part which is on the brim, so as to give this part of each layer a shaggy appearance. For the purpose of smoothing the nap on the outer layer, I first use a brush or card, and then a hot iron. I also use a brush or card to give the nap the desired shagginess on the brim.

If an inner layer of canton-flannel is used, such may be finished by brushing or carding its nap, or it may be left unfinished. In some cases I roughen that part of the nap on the inside layer which is on the brim of the hat, so that both sides of the brim have a like appearance.

I do not claim a hat in which the crown, or that portion which fits the head, is made of buckram and covered with plush similar to the ordinary silk or fur hat, and then united to a felt-brim having a covering of velvet secured thereto by sewing.

What I claim as new, and desire to secure by Letters Patent, is—

1. A head-covering in imitation of a silk, plush, or beaver hat, made of canton-flannel with the nap exposed, the same being held in position by a suitable supporting material, substantially as set forth.

2. A head-covering formed of two layers of canton-flannel, with exposed nap, united and pressed, either or both layers being finished with the nap partly laid smooth and partly shaggy, substantially as described.

3. As a new manufacture, a hat or head-covering the crown or body of which, together with the brim, is made integral of canton-flannel with the nap exposed, substantially as described.

In testimony that I claim the foregoing I have hereunto set my hand and seal this 18th day of September, 1879.

AMELIA BAGLIN. [L. S.]

Witnesses:

CHAS. H. BULKLEY,
WILLIAM BAGLIN.